US010257710B2

(12) United States Patent
Zhang et al.

(10) Patent No.: US 10,257,710 B2
(45) Date of Patent: *Apr. 9, 2019

(54) APPARATUS, SYSTEM AND METHOD FOR MOBILE COMMUNICATION

(71) Applicant: NEC Corporation, Tokyo (JP)

(72) Inventors: Xiaowei Zhang, Tokyo (JP); Anand Raghawa Prasad, Tokyo (JP); Andreas Kunz, Heidelberg (DE); Genadi Velev, Heidelberg (DE); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,515

(22) Filed: Nov. 9, 2017

(65) Prior Publication Data

US 2018/0077578 A1      Mar. 15, 2018

Related U.S. Application Data

(63) Continuation of application No. 15/032,847, filed as application No. PCT/JP2014/005332 on Oct. 21, 2014, now Pat. No. 9,848,334.

(30) Foreign Application Priority Data

Oct. 31, 2013    (JP) ................. 2013-226680

(51) Int. Cl.
*H04W 4/00* (2018.01)
*H04W 12/12* (2009.01)
(Continued)

(52) U.S. Cl.
CPC .............. *H04W 12/12* (2013.01); *H04W 4/70* (2018.02); *H04W 8/12* (2013.01); *H04W 12/04* (2013.01);
(Continued)

(58) Field of Classification Search
CPC ....... H04W 12/12; H04W 4/005; H04W 8/12; H04W 12/04; H04W 12/10; H04W 56/00;
(Continued)

(56) References Cited

U.S. PATENT DOCUMENTS 9,247,471 B2    1/2016  Velev et al.
9,401,820 B2    7/2016  Kim et al.
(Continued)

FOREIGN PATENT DOCUMENTS

CN    102238520 A    11/2011
CN    102340754 A     2/2012
(Continued)

OTHER PUBLICATIONS

3GPP Draft; S3-130890_TR 33.868 V0.15.0, 3rd Generation Partnership Project; Technical Specification Group Services and System Aspects; Security aspects of Machine-Type and other Mobile Data Applications Communications Enhancements; (Release 12) Sep. 2013 (Sep. 30, 2013), XP050727259; 115 pages.*
(Continued)

*Primary Examiner* — Mahendra Patel
(74) *Attorney, Agent, or Firm* — Foley & Lardner LLP

(57) ABSTRACT

In order for making MTC more efficient and/or secure, a base station forming a communication system connects a UE to a core network. A node serves as an entering point to the core network for a service provider, and transmits traffic between the service provider and the UE. The node establishes, as a connection to the base station, a first connection for directly transceiving messages between the node and the base station. Alternatively, the node establishes a second connection for transparently transceiving the messages through a different node that is placed within the core network and has established a different secure connection to the base station.

20 Claims, 14 Drawing Sheets

(51) Int. Cl.
*H04W 12/04* (2009.01)
*H04W 12/10* (2009.01)
*H04W 8/12* (2009.01)
*H04W 4/70* (2018.01)
*H04W 76/14* (2018.01)
*H04L 29/06* (2006.01)

(52) U.S. Cl.
CPC ........... *H04W 12/10* (2013.01); *H04W 76/14* (2018.02); *H04L 63/1466* (2013.01)

(58) Field of Classification Search
CPC ..... H04W 76/023; H04W 76/14; H04W 4/70; H04L 63/1466; H04L 63/068
USPC ..... 455/435.1, 445, 433, 458; 370/329, 320, 370/252
See application file for complete search history.

(56) References Cited

U.S. PATENT DOCUMENTS

| | | | | |
|---|---|---|---|---|
| 9,692,567 | B1* | 6/2017 | Vaidya | H04L 5/0037 |
| 2003/0152098 | A1* | 8/2003 | Zhu | H04L 12/189 |
| | | | | 370/432 |
| 2010/0208696 | A1* | 8/2010 | Lee | H04W 36/0055 |
| | | | | 370/331 |
| 2012/0099525 | A1 | 4/2012 | Maheshwari | |
| 2012/0113982 | A1* | 5/2012 | Akselin | H04L 12/66 |
| | | | | 370/355 |
| 2012/0220296 | A1* | 8/2012 | Ding | H04W 8/04 |
| | | | | 455/435.1 |
| 2012/0269134 | A1* | 10/2012 | Jin | H04W 28/085 |
| | | | | 370/328 |
| 2013/0137469 | A1 | 5/2013 | Schmidt et al. | |
| 2013/0155920 | A1 | 6/2013 | Lim et al. | |
| 2013/0273855 | A1 | 10/2013 | Cherian et al. | |
| 2013/0305386 | A1 | 11/2013 | Zhang et al. | |
| 2013/0322302 | A1* | 12/2013 | Gholmieh | H04W 36/24 |
| | | | | 370/280 |
| 2014/0016614 | A1* | 1/2014 | Velev | H04W 4/70 |
| | | | | 370/331 |
| 2014/0036873 | A1* | 2/2014 | Cheng | H04W 36/0022 |
| | | | | 370/331 |
| 2014/0089442 | A1 | 3/2014 | Kim et al. | |
| 2014/0233538 | A1 | 8/2014 | Zhang et al. | |
| 2014/0301288 | A1 | 10/2014 | Koc et al. | |
| 2014/0378114 | A1* | 12/2014 | Lim | H04W 8/08 |
| | | | | 455/418 |
| 2015/0229620 | A1* | 8/2015 | Zhang | H04L 63/06 |
| | | | | 726/7 |
| 2015/0249542 | A1 | 9/2015 | Xu | |
| 2015/0264739 | A1* | 9/2015 | Hurtta | H04W 4/70 |
| | | | | 370/329 |
| 2015/0282082 | A1* | 10/2015 | Landais | H04W 52/0222 |
| | | | | 370/311 |

FOREIGN PATENT DOCUMENTS

| | | | | |
|---|---|---|---|---|
| CN | 102340826 | A | 2/2012 | |
| CN | 104144524 | A * | 11/2014 | |
| CN | 104144524 | A * | 11/2014 | |
| CN | 104247328 | A * | 12/2014 | ............. H04W 4/70 |
| CN | 105027468 | A | 11/2015 | |
| EP | 2509345 | A1 * | 10/2012 | ............. H04W 4/70 |
| WO | WO 2014148746 | A1 * | 9/2014 | ......... H04W 76/046 |
| WO | WO-2014/161300 | A1 | 10/2014 | |
| WO | WO 2014165657 | A1 * | 10/2014 | ............. H04W 4/70 |
| WO | WO 2014169451 | A1 * | 10/2014 | ............. H04W 4/70 |

OTHER PUBLICATIONS

3GPP Draft; S3-130890_TR 33.868 V0.15.0, 3rd Generation Partnership Project;. Security aspects of Machine-Type and other Mobile Data Applications Communications Enhancements', (Release 12) Sep. 2013 (Sep. 30, 2013), XP050727259.*

3GPP TR 23.887 V.1.2.0. 3rd Generation Partnership Project; Technical Specification Group Services and System Aspects; Machine-Type and other mobile data applications communications enhancements, Release 12, Aug. 2013 (153 pgs.).

3GPP TR 33.868 V.0.15.0. 3rd Generation Partnership Project; Technical Specification Group Services and System Aspects; Security aspects of Machine-Type and other mobile data applications communications enhancements, Release 12, Sep. 2013 (115 pgs.).

3GPP TS 33.102 V.11.5.1. 3rd Generation Partnership Project; Technical Specification Group Services and System Aspects; 3G Security; Security Architecture, Release 11, Jun. 2013 (76 pgs.).

3GPP TS 36.323 V.11.2.0. 3rd Generation Partnership Project; Technical Specification Group Radio Access Network; Evolved Universal Terrestrial Radio Access (E-UTRA); Packet Data Convergence Protocol (PDCP) specification, Release 11, Mar. 2013 (27 pgs.).

International Search Report and Written Opinion dated Feb. 3, 2015 in PCT/JP2014/005332 (8 pgs.).

Notice of Allowance dated Aug. 9, 2017 in U.S. Appl. No. 15/032,847.

Office Action dated Mar. 24, 2017 in U.S. Appl. No. 15/032,847.

Nokia Siemens Networks, Nokia Corporation. "Roaming architecture for device triggering". 3GPP Draft, S2-124472, SA WG2 Meeting #94, Nov. 12-16, 2012 (7 pgs.).

Extended European Search Report dated Feb. 13, 2018 in related European Appl. 17199672.1 (6 pgs.).

Office Action dated Jun. 12, 2018 in related Japanese Appl. 2016-527473 with English-language translation (6 pgs.).

Office Action dated Dec. 3, 2018 in related Chinese Appl. 201480060035.2 with English-language translation (28 pgs.).

* cited by examiner

APPARATUS, SYSTEM AND METHOD FOR MOBILE COMMUNICATION

CROSS-REFERENCE TO RELATED APPLICATIONS

This application is a continuation of U.S. application Ser. No. 15/032,847, filed Apr. 28, 2016, which is a National Stage Entry of International Application No. PCT/JP2014/005332, filed Oct. 21, 2014; which is based upon and claims the benefit of priority from Japanese patent application No. 2013-226680, filed on Oct. 31, 2013; the disclosures of all of which are incorporated by reference herein in their entirety.

TECHNICAL FIELD

The present invention relates to an apparatus, a system and a method for MTC (Machine-Type-Communication), and particularly to an interface between a base station and a core network node.

BACKGROUND ART

MTC brings very different characteristics to the current mobile communications system such as extremely power constrained, mostly very low data-rate, intermittent data, very large number of devices and generally low mobility. The SAE (System Architecture Evolution)/LTE (Long Term Evolution) system can be optimized for these MTC characteristics and thus architecture enhancements may be needed which can 1) cater for the MTC characteristics, while 2) minimizing impact on current network is needed.

Note that the architecture of MTC has been studied in NPLs 1 and 2, for example.

CITATION LIST

Non Patent Literature

NPL 1: 3GPP TR 33.868, "Security aspects of Machine-Type and other Mobile Data Applications Communications Enhancements; (Release 12)", V0.15.0, 2013-09, Clauses 5.1 and 5.7, pp. 13-30 and 67-104
NPL 2: 3GPP TR 23.887, "Machine-Type and other mobile data applications Communications enhancements (Release 12)", V1.2.0, 2013-08, Clause 5.1.1.3.3, pp. 25-32

SUMMARY OF INVENTION

Technical Problem

However, the inventors of this application have found that there are problems in current proposed solutions for T5 interface based device triggering and SDT (small data transmission) in 3GPP (3rd Generation Partnership Project). For example, the messages for device triggering and SDT will be concentrated in very limited number of nodes e.g. the MME (Mobility Management Entity). This could lead to various attacks to the nodes or cause overload to the nodes such that they are not able to fulfill all requests. Note that the device triggering and the small data are the messages in small size, and the interface T5 is a reference point which resides between the MME and an MTC-IWF (MTC Inter-Working Function).

In current T5 based solution, the small data are carried in NAS (Non-Access Stratum) message and it relies on NAS security, which has the following impact to the system.

1) It will increase the load to NAS layer and to MME for security processing.
2) It causes NAS COUNT wrap around issue in which the AKA (Authentication and Key Agreement) procedure will be performed to negotiate new NAS keys. This may also lead loading to HSS (Home Subscriber Server).
3) Since the current authorization on SCS (Service Capability Server) is not enough (for example there no check on frequency of sending SD (Small Data), no check on whether normal data is sent as small data), DL (Downlink) NAS message now is triggered by SCS. This is to open MME to internet and cause attack to the network element.

Accordingly, an exemplary object of the present invention is to provide a solution for making MTC more efficient and/or secure.

Solution to Problem

In order to achieve the above-mentioned object, a node according to first exemplary aspect of the present invention serves as an entering point to a core network for a service provider. This node includes: establishment means for establishing a connection to a base station; and transmission means for transmitting, by use of the connection, traffic between the service provider and a UE (User Equipment) that attaches to the core network through the base station. The establishment means is configured to establish as the connection: a first connection for directly transceiving messages between the node and the base station; or a second connection for transparently transceiving the messages through a different node that is placed within the core network and has established a different secure connection to the base station.

Further, a node according to second exemplary aspect of the present invention manages mobility of a UE attaching to a core network through a base station. This node includes: transfer means for transparently transferring messages between the base station and a different node, the different node serving as an entering point to the core network for a service provider and transmitting traffic between the service provider and the UE.

Further, a node according to third exemplary aspect of the present invention manages subscription information on a UE attaching to a core network through a base station. This node includes: request means for requesting information on the base station from a first node that manages mobility of the UE; and send means for sending the information to a second node that serves as an entering point to the core network for a service provider and that transmits traffic between the service provider and the UE.

Further, a base station according to fourth exemplary aspect of the present invention includes: transceiving means for transceiving messages between the base station and a node through a first connection or a second connection to the node, the node serving as an entering point to a core network for a service provider and transmitting traffic between the service provider and a UE that attaches to the core network through the base station, the first connection being for directly transceiving the messages, the second connection being for transparently transceiving the messages through a different node that is placed within the core network and has established a different secure connection to the base station.

Further, a UE according to fifth exemplary aspect of the present invention attaches to a core network through a base station and that communicates with a service provider. This UE includes: send means for sending, on a radio bearer shared with one or more different UEs, to the base station a message to be transmitted to the service provider through the core network.

Further, a communication system according to sixth exemplary aspect of the present invention includes: a base station that connects a UE to a core network; and a node that serves as an entering point to the core network for a service provider and that transmits traffic between the service provider and the UE. The node establishes as a connection to the base station: a first connection for directly transceiving messages between the node and the base station; or a second connection for transparently transceiving the messages through a different node that is placed within the core network and has established a different secure connection to the base station.

Further, a method according to seventh exemplary aspect of the present invention provides a method of controlling operation in a node that serves as an entering point to a core network for a service provider. This method includes: establishing a connection to a base station; and transmitting, by use of the connection, traffic between the service provider and a UE that attaches to the core network through the base station. As the connection, one of following connections is established: a first connection for directly transceiving messages between the node and the base station; or a second connection for transparently transceiving the messages through a different node that is placed within the core network and has established a different secure connection to the base station.

Further, a method according to eighth exemplary aspect of the present invention provides a method of controlling operations in a node that manages mobility of a UE attaching to a core network through a base station. This method includes: transparently transferring messages between the base station and a different node, the different node serving as an entering point to the core network for a service provider and transmitting traffic between the service provider and the UE.

Further, a method according to ninth exemplary aspect of the present invention provides a method of controlling operations in a node that manages subscription information on a UE attaching to a core network through a base station. This method includes: requesting information on the base station from a first node that manages mobility of the UE; and sending the information to a second node that serves as an entering point to the core network for a service provider and that transmits traffic between the service provider and the UE.

Further, a method according to tenth exemplary aspect of the present invention provides a method of controlling operations in a base station. This method includes: transceiving messages between the base station and a node through a first connection or a second connection to the node, the node serving as an entering point to a core network for a service provider and transmitting traffic between the service provider and a UE that attaches to the core network through the base station, the first connection being for directly transceiving the messages, the second connection being for transparently transceiving the messages through a different node that is placed within the core network and has established a different secure connection to the base station.

Further, a method according to eleventh exemplary aspect of the present invention provides a method of controlling operations in a UE that attaches to a core network through a base station and that communicates with a service provider. This method includes: sending, on a radio bearer shared with one or more different UEs, to the base station a message to be transmitted to the service provider through the core network.

Further, a method according to twelfth exemplary aspect of the present invention provides a method of establishing security association in a mobile communication system including a UE (User Equipment) and an MTC-IWF (Machine-Type-Communication Inter-Working Function). This method includes: providing by a protocol between the UE and the MTC-IWF, ciphering, deciphering, integrity protection and integrity verification; and including a key identifier of subkeys for the UE and the MTC-IWF in a packet format of the protocol. The key identifier determines the subkeys to be used for small data transmission protection or trigger message transmission protection.

Further, a mobile communication system according to thirteenth exemplary aspect of the present invention includes: a UE (User Equipment); and an MTC-IWF (Machine-Type-Communication Inter-Working Function). A protocol between the UE and the MTC-IWF provides ciphering, deciphering, integrity protection and integrity verification. A packet format of the protocol includes a key identifier of subkeys for the UE and the MTC-IWF. The key identifier determines the subkeys to be used for small data transmission protection or trigger message transmission protection.

Further, an MTC-IWF (Machine-Type-Communication Inter-Working Function) according to fourteenth exemplary aspect of the present invention includes: first means for connecting with a UE (user equipment) via a base station; and second means for performing authorization on the UE and an SCS (Service Capability Server). A protocol between the UE and the MTC-IWF provides ciphering, deciphering, integrity protection and integrity verification. A packet format of the protocol includes a key identifier of subkeys for the UE and the MTC-IWF. The key identifier determines the subkeys to be used for small data transmission protection or trigger message transmission protection.

Furthermore, a UE (User Equipment) according to fifteenth exemplary aspect of the present invention establishes security association with an MTC-IWF (Machine-Type-Communication Inter-Working Function) in a mobile communication system. This UE includes: first means for sending small data to an SCS (Service Capability Server) or receiving small data or a trigger message from the SCS via the MTC-IWF; and second means for sharing a key and subkeys with the MTC-IWF for confidentiality and integrity protection. A protocol between the UE and the MTC-IWF provides ciphering, deciphering, integrity protection and integrity verification. A packet format of the protocol includes a key identifier of subkeys for the UE and the MTC-IWF. The key identifier determines the subkeys to be used for small data transmission protection or trigger message transmission protection.

Advantageous Effects of Invention

According to the present invention, it is possible to solve the above-mentioned problems, and thus to provide a solution for making MTC more efficient and/or secure.

DESCRIPTION OF EMBODIMENTS

Hereinafter, an exemplary embodiment of nodes, a base station and a UE according to the present invention, and communication systems to which these nodes, base station and UE are applied, will be described with the accompany drawings.

This exemplary embodiment considers a UE subscribing to MTC (M2M (Machine-to-Machine)) service, but the present invention is not limited to MTC (M2M) type of application.

1. New Interface T6:

This exemplary embodiment proposes a direct interface between an MTC-IWF and an eNB (evolved Node B), named T6. This interface is for secure and efficient MTC communication and it supports both CP (Control Plane) and UP (User Plane). Idea is to use the MTC-IWF as the end point in a mobile network for interconnection with a service provider, and can achieve the following advantageous effects (A) to (G), for example.

(A) Offload MME burden caused by the large number of devices communication in case of T5 triggering and small data delivery.

(B) Offload MME burden caused by the processing for NAS security in case of T5 triggering and small data delivery.

(C) Prevent DoS (Denial-of-Service) attack to network element and UE from SCS side.

(D) Prevent DoS attack to network element and SCS from UE side.

(E) Trigger and small data transmission can be independent from NAS security.

(F) MTC-IWF as center point of MTC communication means that UE can also connect over WiFi or any other network element which has interface with MTC-IWF, without any modification.

(G) MTC-IWF can take care of all issues related to MTC being discussed in 3GPP.

For a given UE, the MTC-IWF can find the serving eNB indirectly by obtaining the serving eNB information from MME via HSS, or directly from MME. MTC trigger and small data are delivered over the T6 interface. MTC-IWF and UE establish a security association, and the trigger and small data are protected with keys shared between UE and MTC-IWF.

As an option, MTC-IWF can send the integrity session key it shares with UE to eNB, and thus eNB can perform authorization at an early stage to prevent DoS attack from UEs to network.

Figure 1:
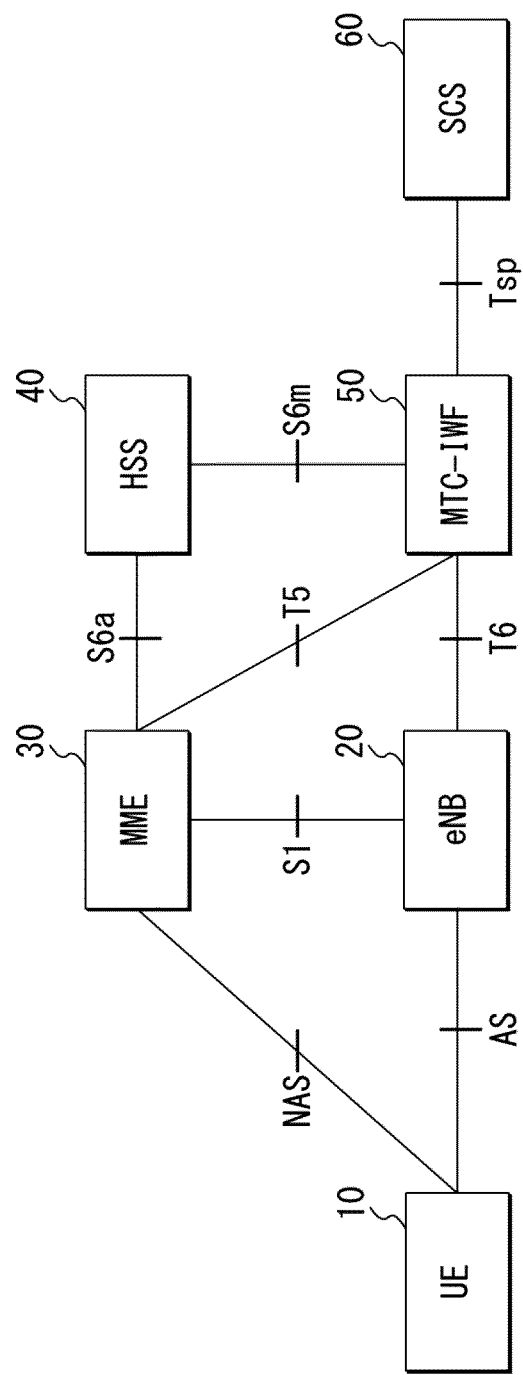
FIG. 1 is a block diagram showing a first configuration example of communication systems according to an exemplary embodiment of the present invention.
Figure 2:
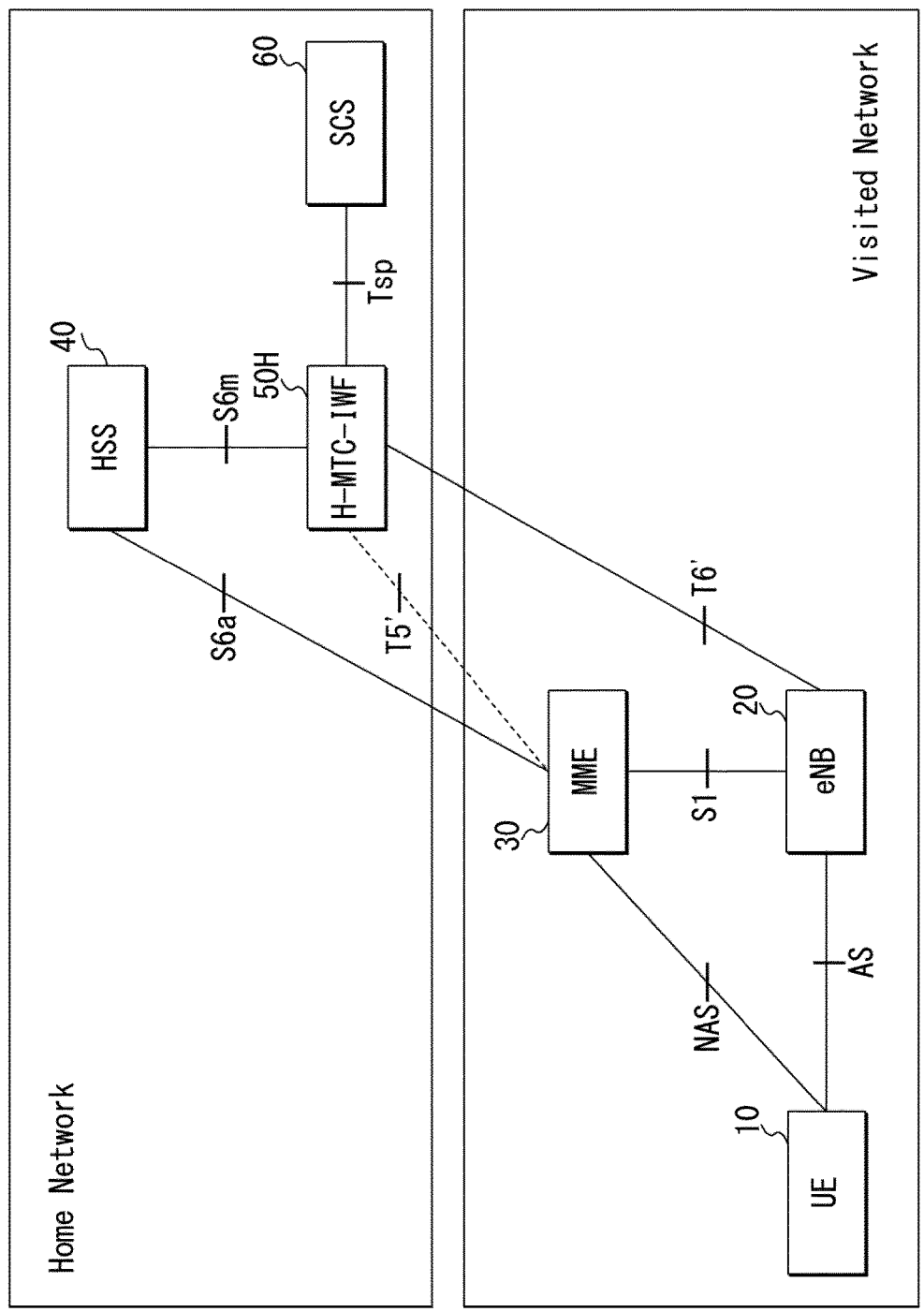
FIG. 2 is a block diagram showing a second configuration example of the communication systems according to the exemplary embodiment.
Figure 3:
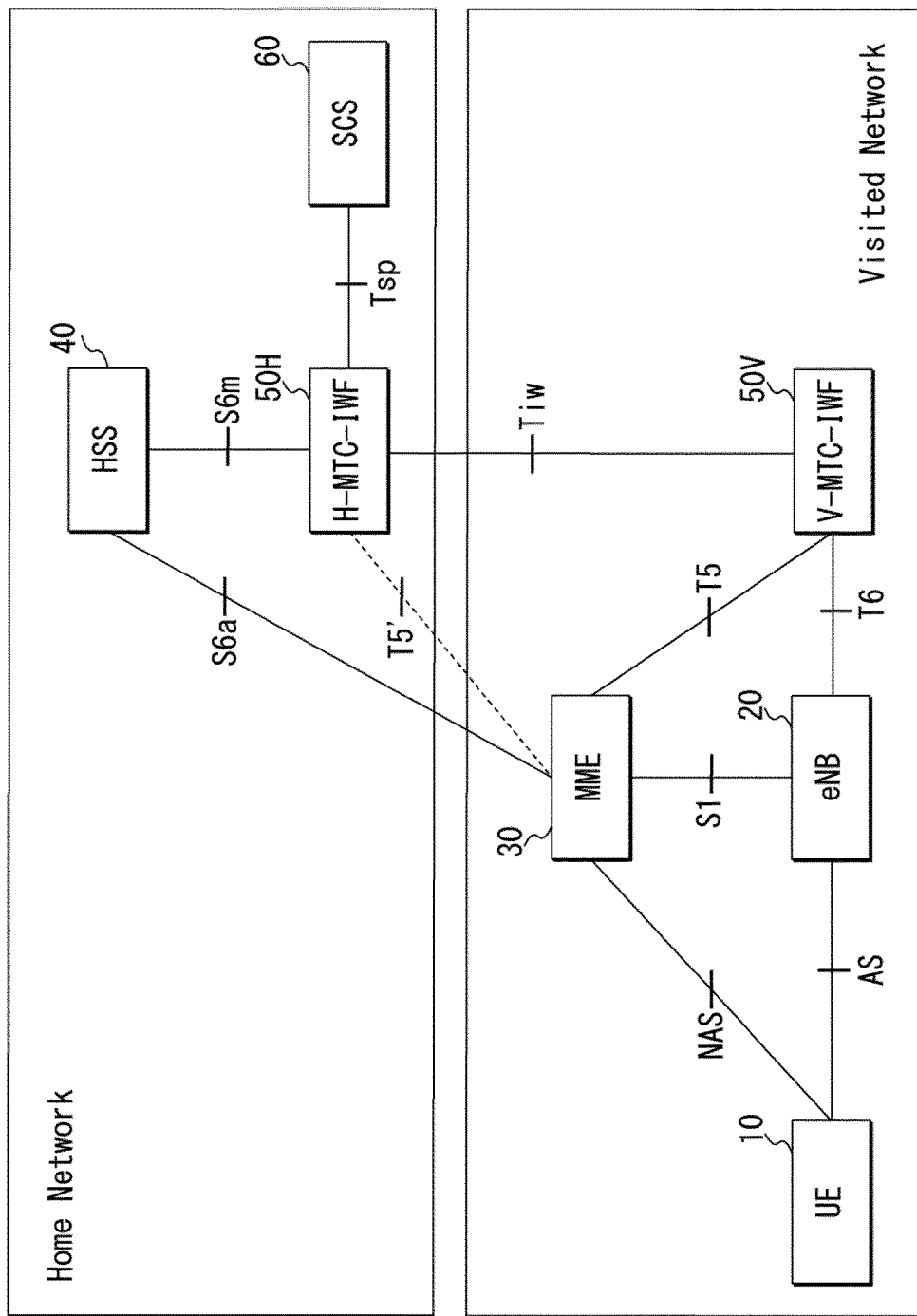
FIG. 3 is a block diagram showing a third configuration example of the communication systems according to the exemplary embodiment.

FIGS. 1 to 3 show the architecture with new interface T6.

FIG. 1 shows a configuration example of a communication system for non-roaming case.

As shown in FIG. 1, this communication system includes one or more UEs 10, one or more eNB 20, a core network, and an SCS 60. The core network includes, as its network nodes, an MME 30, an HSS 40, and an MTC-IFW 50. Note that although the illustration is omitted, the core network also includes, as other network nodes, an SGSN (Serving GPRS (General Packet Radio Service) Support Node), an MSC (Mobile Switching Centre) and the like. The SGSN and the MSC function as with the MME 30.

The UE 10 attaches to the MME 30 through the eNB 20, thereby communicating with the SCS 60 through the core network. Messages between the UE 10 and the eNB 20 can be carried on AS (Access Stratum) security. Messages between the UE 10 and the MME 30 can be carried on NAS security. Note that the UE 10 is a UE equipped for MTC, which will be sometimes referred to as "MTC UE" or "MTC device" in the following description.

The eNB 20 forms a RAN (Radio Access Network), thereby connecting the UE 10 to the core network. As mentioned above, messages between the eNB 20 and the MTC-IWF 50 can be carried over the interface T6. Messages between the eNB 20 and the MME 30 can be carried over an interface S1.

The MME 30 manages mobility of the UE 10. Messages between the MME 30 and the HSS 40 are carried over an interface S6a. Messages between the MME 30 and the MTC-IWF 50 can be carried over the interface T5.

The HSS 40 manages subscription information on the UE 10. Messages between the HSS 40 and the MTC-IWF 50 are carried over an interface S6m.

The MTC-IWF 50 serves as an entering point to the core network for the SCS 60. Messages between the MTC-IWF 50 and the SCS 60 are carried over an interface Tsp. Upon transmitting traffic between the UE 10 and the SCS 60, the MTC-IWF uses the interface T6.

The SCS 60 connects to the core network to communicate with the UE 10. The UE 10 can host one or multiple MTC Applications. The corresponding MTC Applications in the external network are hosted on the SCS 60.

On the other hand, there are two options of network architecture in roaming case.

As shown in FIG. 2, in a case where there is no MTC-IWF in VPLMN (Visited PLMN (Public Land Mobile Network)), an H-MTC-IWF (Home MTC-IWF) 50H connects to the eNB 20 via an interface T6'.

As shown in FIG. 3, in a case where there is a MTC-IWF in VPLMN (V-MTC-IWF), the H-MTC-IWF 50H connects to a V-MTC-IWF 50V via an interface Tiw. As with the MTC-IWF 50 shown in FIG. 1, the V-MTC-IWF 50V connects to the eNB 20 via the interface T6, and connects to the MME 30 via the interface T5.

Figure 4:
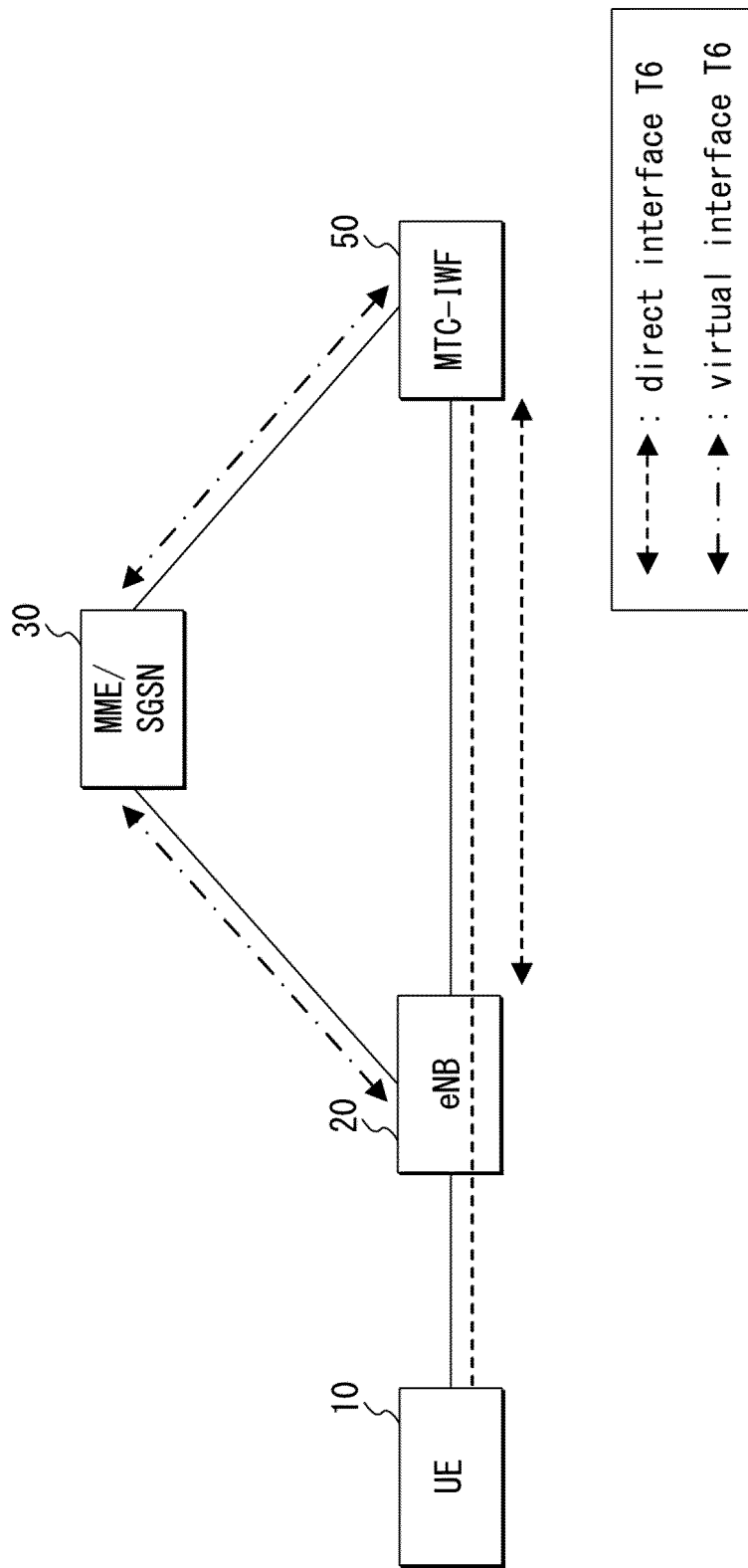
FIG. 4 is a block diagram showing examples of connections established between a first node and a base station according to the exemplary embodiment.

2. Protocol Stack and Message Flow:

FIG. 4 shows message flow in case of non-roaming. The end-points in 3GPP network for small data and device trigger are UE and MTC-IWF.

There are two ways to transmit the messages carrying small data and device trigger by:

1) using the direct interface T6 between the eNB 20 and the MTC-IWF 50, as shown by dotted lines in FIG. 4; and 2) using the virtual interface T6, as shown by dashed-dotted lines in FIG. 4.

In the way 2), the SDDTE (Small Data and Device Triggering Enhancements) protocol is carried hop-by-hop. The eNB 20 and the MME 30 verify whether there is a higher layer protocol (i.e. SDDTE) carrying SD incase the message is carrying SD, they only forward the message but do not perform any process for NAS and AS security.

Figure 5:
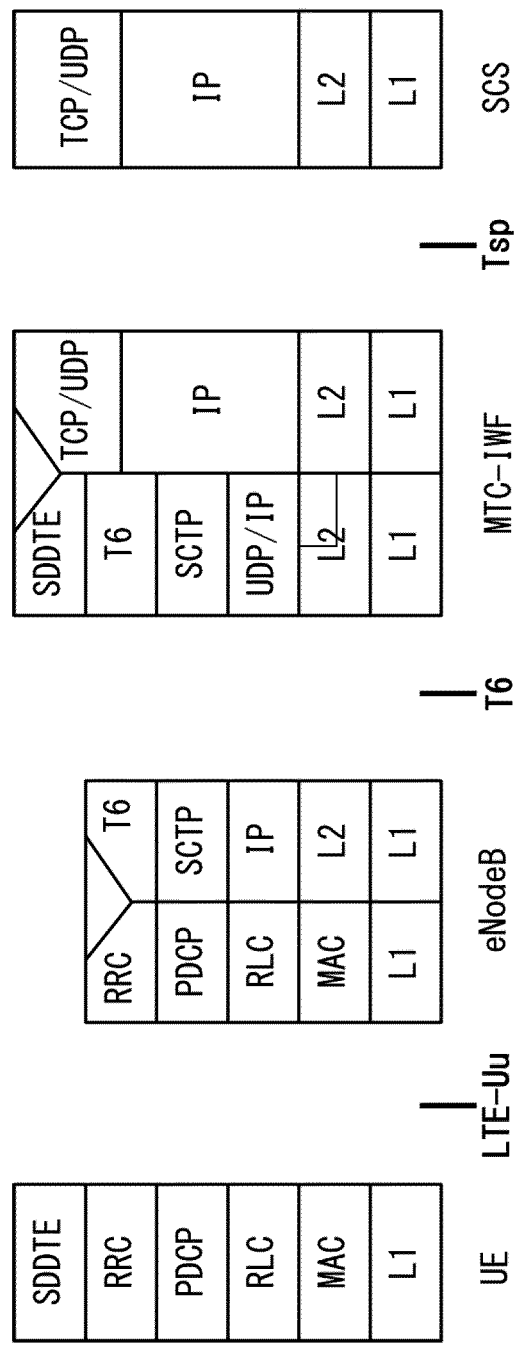
FIG. 5 is a block diagram showing an example of protocol stacks used for the communication systems according to the exemplary embodiment.
Figure 6:
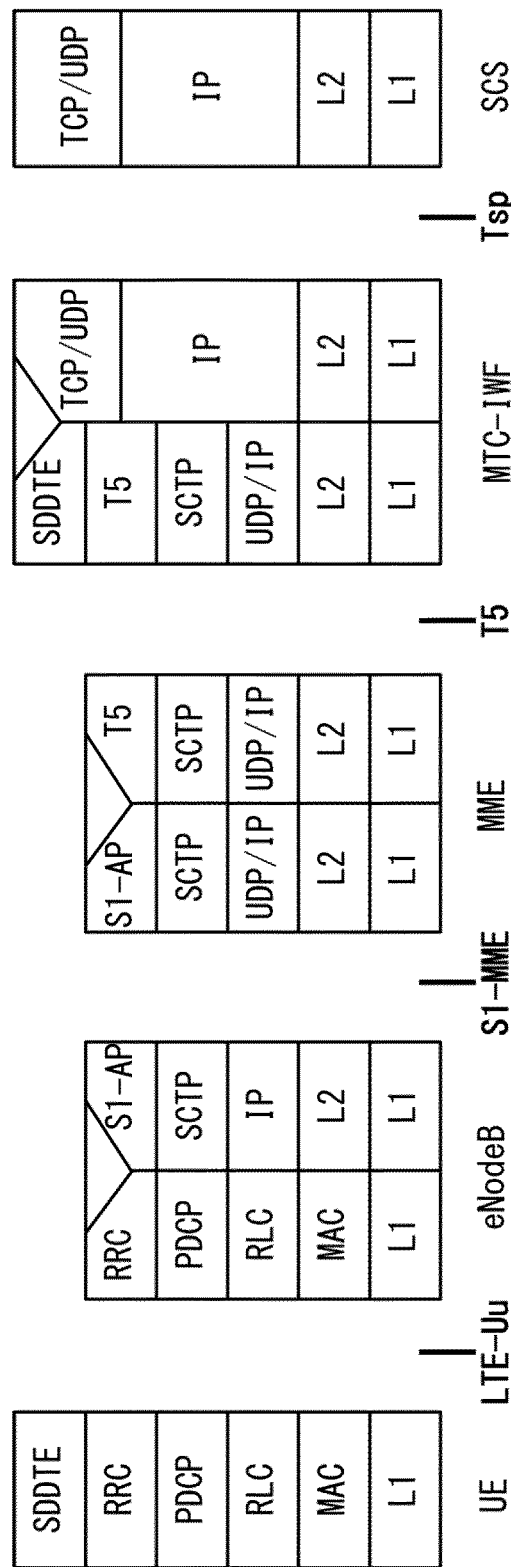
FIG. 6 is a block diagram showing another example of the protocol stacks used for the communication systems according to the exemplary embodiment.

FIG. 5 shows the proposed protocol stack with using the direct interface. Meanwhile, FIG. 6 shows the proposed protocol stack with using the virtual interface. The protocol SDDTE spans between the UE 10 and the MTC-IWF 50, and can be transparent to the MME/SGSN 30.

As shown in FIG. 5, when the interface T6 is a direct interface between the eNB 20 and the MTC-IWF 50, the small data and device trigger are transmitted over it directly, and over LTE-Uu between the eNB 20 and the UE 10.

As shown in FIG. 6, when the interface T6 is a virtual interface, the small data and derive trigger are transmitted hop-by-hop over T5, S1-MME and LTE-Uu. In comparison with T5 solution, in this exemplary embodiment, when the eNB 20 and the MME 30 verify there is an upper protocol (SDDTE) carrying SD, it only forwards the messages between the MTC-IWF 50 and the eNB 20.

New things here:
  Modification on the RRC (Radio Resource Control) at LTE-Uu interface and S1-AP at S1-MME interface for SDDTE transmission; and
  Messages that are sent over T6, which will be given in next section.

Note that the description as to the interface T6 in this section is similarly applied to the interface T6' shown in FIG. 2 and the interface T6 between the eNB 20 and the V-MTC-IWF 50V shown in FIG. 3.

Next, operation examples of this exemplary embodiment will be described in detail with reference to FIGS. 7 to 10. Note that configuration examples of the MTC-IWF 50, the MME 30, the HSS 40, the eNB 20, and the UE 10 will be described later with reference to FIGS. 11 to 15.

3. Device Trigger and Small Data Transmission:

In this section, message flows of MTC device trigger and Small Data Transmission will be described.

Figure 7:
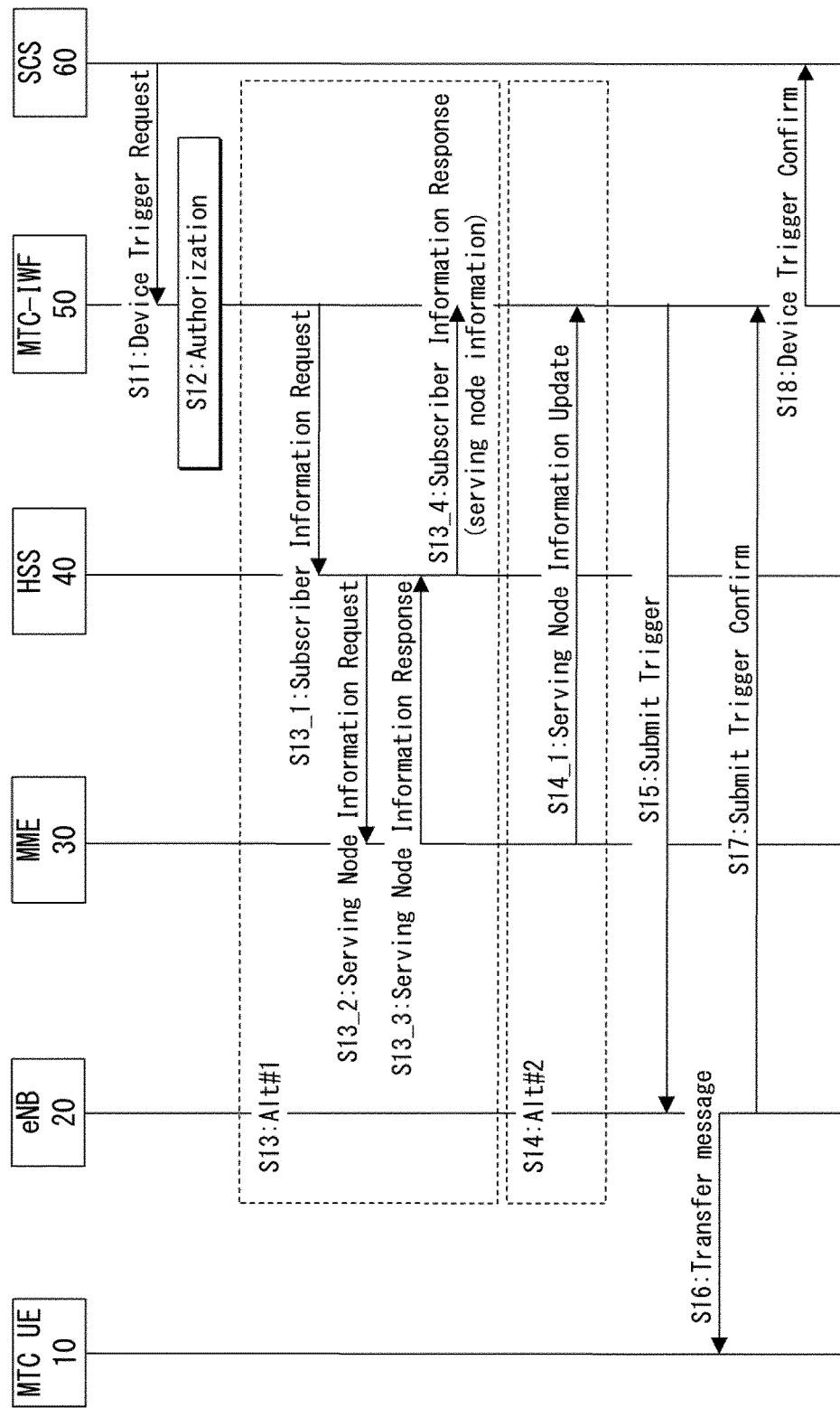
FIG. 7 is a sequence diagram showing a first example of operations in the communication systems according to the exemplary embodiment.

3.1. MTC Device Trigger:

FIG. 7 shows the trigger delivery flow. Steps S15 and S17 are new messages using the T6 interface. Moreover, messages shown at steps S13 and S14 are also modified from the existing messages defined in 3GPP.

As shown in FIG. 7, the SCS 60 sends a Device Trigger Request to the MTC-IWF 50 (step S11).

The MTC-IWF 50 performs authorization (step S12). When the MTC-IWF 50 does not have subscriber and serving node information, for example, when the MTC-IWF 50 receives request to the UE 10 for the first time, the MTC-IWF 50 will request the HSS 40 for them (step S13).

Specifically, the MTC-IWF 50 requests to the HSS 40 of the target device subscriber information (step S13_1). The HSS 40 sends a Serving Node Information Request to the MME 30 (step S13_2). The MME 30 can be the last MME that the UE 10 attached to. The MME 30 responds with a Serving Node Information Response (step S13_3). The MME 30 provides the current eNB information to the HSS 40. The HSS 40 sends a Subscriber Information Response with serving node information to the MTC-IWF 50 (step S13_4).

Alternatively or in addition, the MME 30 sends a Serving Node Information Update message to the MTC-IWF 50 each time the serving eNB is changed (step S14_1). The proposed solution is therefore most effective for low mobility MTC UEs.

The MTC-IWF 50 submits the Trigger to the current serving eNB 20 over the interface T6 (step S15).

The eNB 20 pages the UE 10 locally without MME involvement and transfers the message to the UE 10 (step S16). The UE 10 may also respond with Ack (Acknowledgement) message.

The eNB 20 sends a Submit Trigger Confirm message to the MTC-IWF 50 over the interface T6 (step S17).

The MTC-IWF 50 sends the Device Trigger confirm message to the SCS 60 (step S18).

Figure 8:
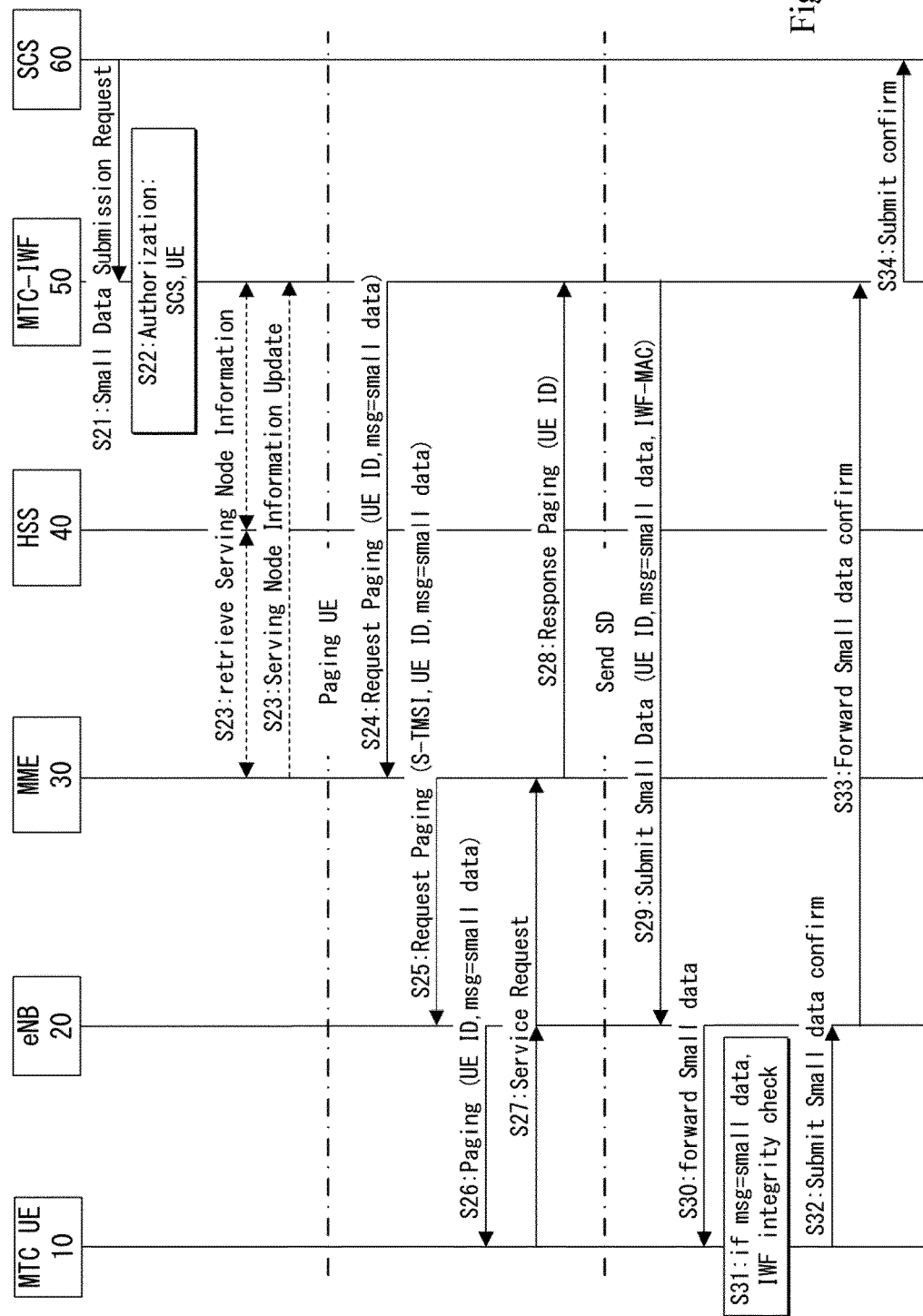
FIG. 8 is a sequence diagram showing a second example of the operations in the communication systems according to the exemplary embodiment.

3.2. MT Small Data Transmission:

FIG. 8 shows the MT (Mobile Terminated) Small data transmission flow. The MTC-IWF 50 triggers the MME 30 to use normal Paging procedure with indication of small data to inform there will be a small data. When the MTC-IWF 50 receives a response of Paging, the MTC-IWF 50 sends the small data over interface T6. Steps S24, S28, S29 and S33 are new messages.

As shown in FIG. 8, the SCS 60 sends a Small Data Submission Request to the MTC-IWF 50 (step S21).

The MTC-IWF 50 performs authorization on the SCS 60 and the UE 10 (step S22). Upon a successful authorization, the MTC-IWF 50 retrieves the serving node information, from the HSS 40 or directly from the MME 30. Alternatively, the MME 30 sends the Serving Node Information Update to the MTC-IWF 50 each time the serving eNB is changed (step S23).

The MTC-IWF 50 sends a Request Paging message to the MME 30 with UE ID and msg="small data" to inform the UE 10 that small data will be delivered to it (step S24). Alternatively, the MTC-IWF 50 submits the small data directly to the eNB 20 at step S29, and skips the following steps S24 to S28 in between. In this case, the eNB 20 performs a local paging of the MTC UE 10 without involving the MME 30 before forwarding the small data to the UE 10. This would be more effective especially for low mobility MTC UEs.

The MME 30 sends the Request Paging message to the eNB 20 (step S25).

The eNB 20 sends the Paging message to the UE 10 (step S26).

The UE 10 responds to the Paging from the MME 30 with a Service Request message (step S27).

The MME 30 sends a Response Paging message with UE ID and the eNB address to the MTC-IWF 50 (step S28). This will indicate the MTC-IWF 50 that the MME 30 has paged the UE 10 and received a response, and thus the MTC-IWF 50 can send the small data directly to the eNB 20.

The MTC-IWF 50 sends the small data to the eNB 20 with target UE ID, indicator of msg="small data", with integrity protection by the key shared between the UE 10 and the MTC-IWF 50 (step S29).

The eNB 20 forwards the Small Data to the UE 10 (step S30).

If the indicator shows msg="small data", the UE 10 performs integrity check with the key it shares with the MTC-IWF 50 (step S31).

The UE 10 sends a confirm of receiving the Small Data if the integrity check was successful at previous step S31 (step S32).

The eNB 20 forwards the submit small data confirm to the MTC-IWF 50 (step S33).

The MTC-IWF 50 forwards the submit confirm to the SCS 60 (step S34).

Figure 9:
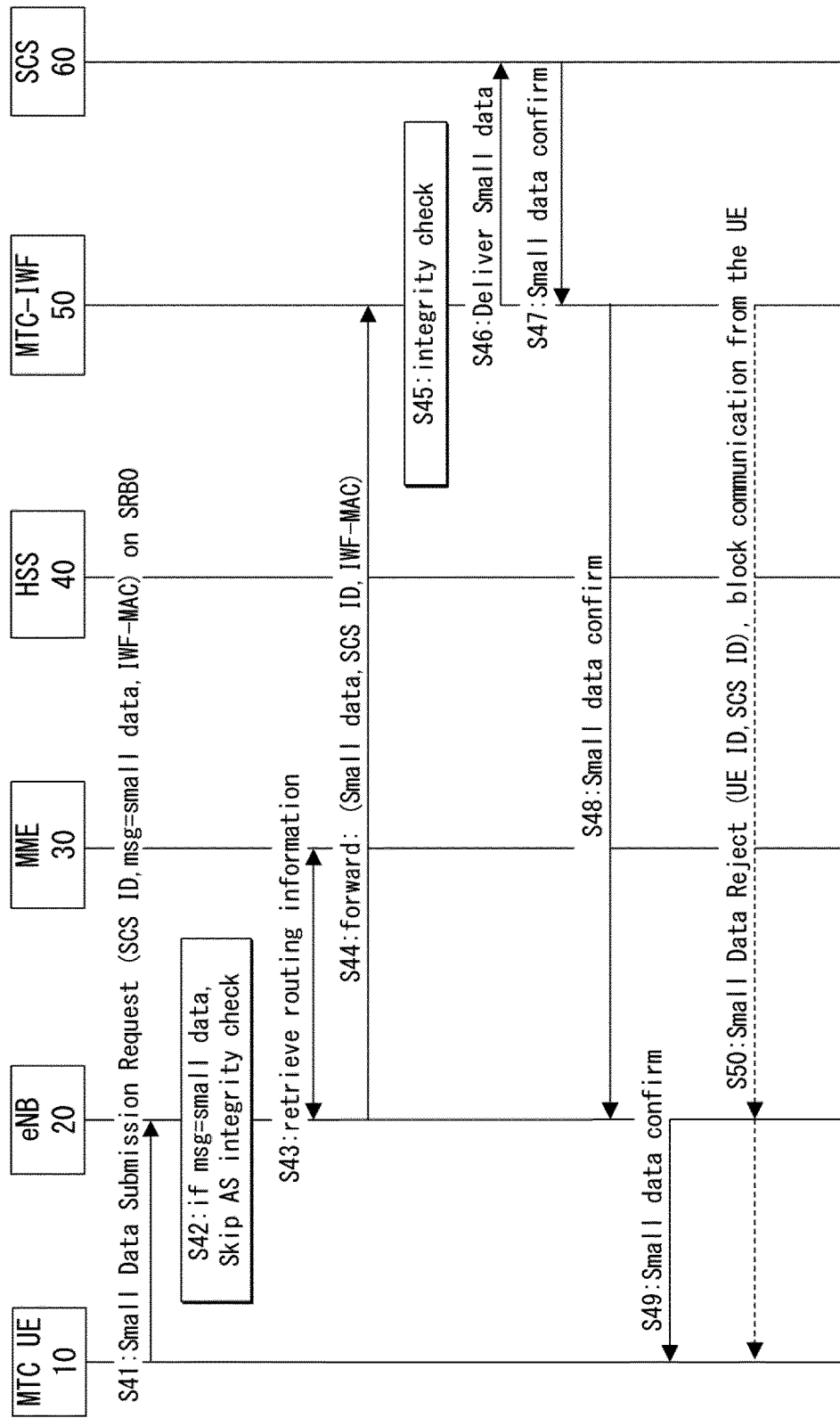
FIG. 9 is a sequence diagram showing a third example of the operations in the communication systems according to the exemplary embodiment.

3.3. MO Small Data Transmission:

FIG. 9 shows the MO (Mobile Originated) Small data transmission flow. Step S44, S48 and S50 are new messages using the interface T6. A message shown at step S43 is also new.

As shown in FIG. 9, the UE 10 sends a Small Data Submission Request with integrity and/or confidentiality protection by the key it shares with the MTC-IWF 50 (step S41).

The request message is sent on SRB0 (Signalling Radio Bearer 0, as defined in 3GPP 36.331), and it contains SCS ID. There is no need to establish RRC connection between the UE 10 and the eNB 20, so that RRC signaling can be reduced.

The eNB 20 will skip AS integrity check if the msg="small data" (step S42).

The eNB 20 retrieves routing information from the MME 30, of which MTC-IWF to communicate with (step S43).

Then, the eNB 20 forwards the small data to the MTC-IWF 50 (step S44).

The MTC-IWF 50 performs integrity check, with the key it shares with the UE 10 (step S45). If the integrity check is successful, the MTC-IWF 50 delivers small data to the SCS 60 (step S46).

The SCS 60 responds Small data confirm to the MTC-IWF 50 (step S47).

The MTC-IWF 50 forwards the Small data confirm to the eNB 20 (step S48).

The eNB 20 forwards the Small data confirm to the UE 10 (step S49).

If the integrity check fails at above Step S6, the MTC-IWF 50 sends Small Data Reject to the UE 10 (step S50).

3.4. T6 Connection Release:

If the T6 connection has not been active for a given time then it can be released. The T6 connection release procedure is given in FIG. 10.

Figure 10:
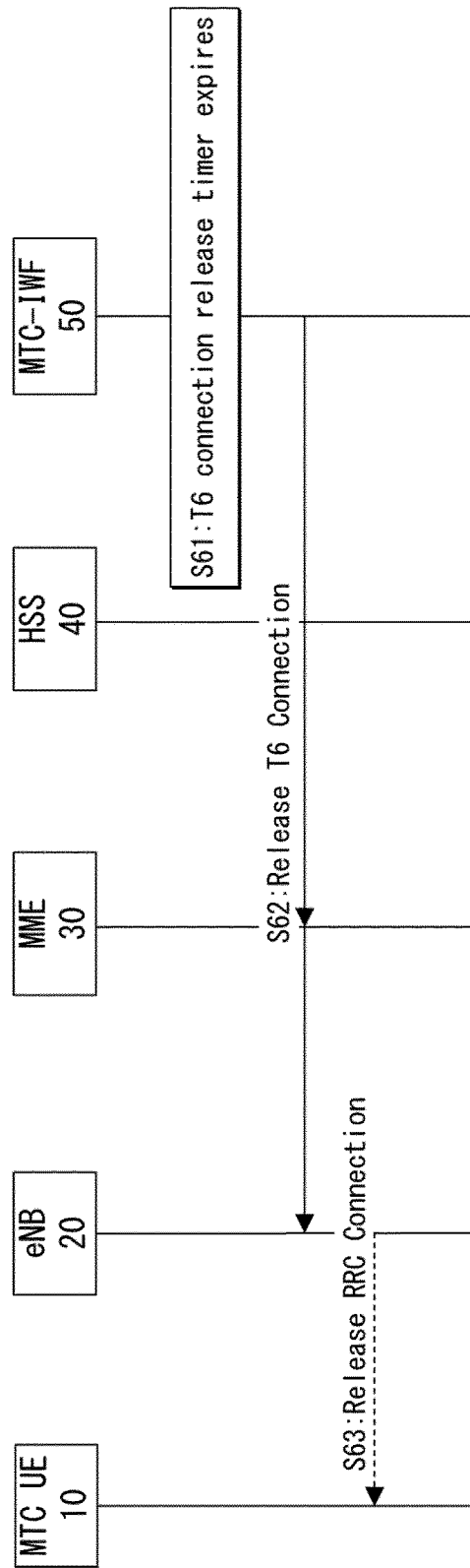
FIG. 10 is a sequence diagram showing a fourth example of the operations in the communication systems according to the exemplary embodiment.

As shown in FIG. 10, a T6 connection release timer expires at the MTC-IWF 50 (step S61).

At this time, the MTC-IWF 50 indicates the eNB 20 to release the T6 Connection (step S62). When the T6 connection is released, the eNB 20 removes related information for small data and device trigger. Note that this procedure is also applied to the MME 30 when virtual interface T6 is in use.

The eNB 20 sends Release RRC Connection to the UE 10, if there is a RRC Connection (step S63).

4. Changes to Current Network Element:

4.1. Changes to eNB:

Need to support new interface T6, new protocol, need to interact with MME for MTC-IWF information, verify if the message carries SD, (optionally) perform authorization on UE.

4.2. Changes to HSS

HSS will query MME about serving eNB information and provide it to MTC-IWF at initial phase.

Next, configuration examples of the MTC-IWF 50, the MME 30, the HSS 40, the eNB 20, and the UE 10 will be described with reference to FIGS. 11 to 15. Note that in the following explanation, there will be described only elements which specific to this exemplary embodiment. However, it will be understood that the MTC-IWF 50, the MME 30, the HSS 40, the eNB 20, and the UE 10 also include elements for functioning as typical MTC-IWF, MME, HSS, eNB and UE, respectively.

Figure 11:
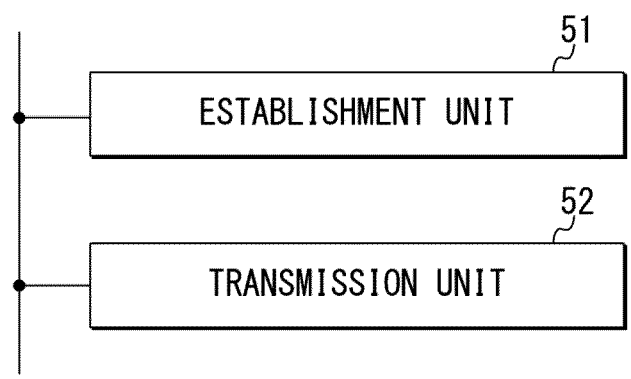
FIG. 11 is a block diagram showing a configuration example of the first node according to the exemplary embodiment.

As show in FIG. 11, the MTC-IWF 50 includes an establishment unit 51 and a transmission unit 52. The establishment unit 51 establishes the above-mentioned T6 connection to the eNB 20. Upon establishing the T6 connection, the establishment unit 51 acquires the Serving Node Information from the MME 30 or the HSS 40. Through the T6 connection, the transmission unit 52 transmits the above-mentioned MTC device trigger message and Small Data Transmission message between the UE 10 and the SCS 60. Note that these units 51 and 52 are mutually connected with each other through a bus or the like. These units 51 and 52 can be configured by, for example, transceivers which respectively conduct communication with the eNB 20, the MME 30, the HSS 40 and the SCS 60, and a controller such as a CPU (Central Processing Unit) which controls these transceivers.

Figure 12:
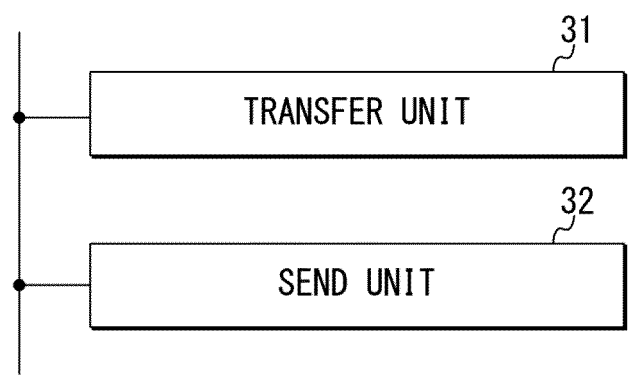
FIG. 12 is a block diagram showing a configuration example of a second node according to the exemplary embodiment.

As show in FIG. 12, the MME 30 includes a transfer unit 31 and a send unit 32. Over the virtual interface T6, the transfer unit 31 transparently transfers the MTC device trigger message and the Small Data Transmission message between the eNB 20 and the MTC-IWF 50. The send unit 32 sends the Serving Node Information directly to the MTC-IWF 50, or through the HSS 40. Note that these units 31 and 32 are mutually connected with each other through a bus or the like. These units 31 and 32 can be configured by, for example, transceivers which respectively conduct communication with the eNB 20, the HSS 40 and the MCT-IWF 50, and a controller such as a CPU which controls these transceivers.

Figure 13:
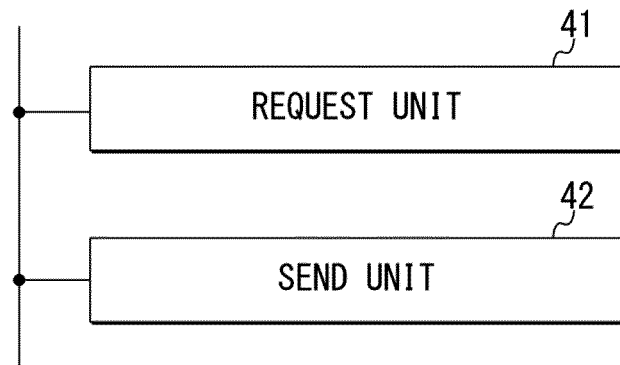
FIG. 13 is a block diagram showing a configuration example of a third node according to the exemplary embodiment.

As shown in FIG. 13, the HSS 40 includes a request unit 41 and a send unit 42. The request unit 41 requests the Serving Node Information from the MME 30. The send unit 42 sends the Serving Node Information to the MTC-IWF 50. Note that these units 41 and 42 are mutually connected with each other through a bus or the like. These units 41 and 42 can be configured by, for example, transceivers which respectively conduct communication with the MME 30 and the MCT-IWF 50, and a controller such as a CPU which controls these transceivers.

Figure 14:
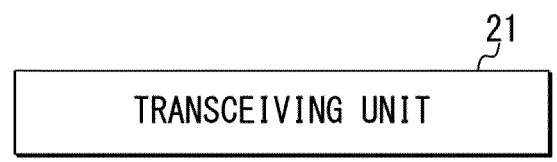
FIG. 14 is a block diagram showing a configuration example of the base station according to the exemplary embodiment.

As shown in FIG. 14, the eNB 20 includes a transceiving unit 21. Through the T6 connection, the transceiving unit 21 transceives the MTC device trigger message and the Small Data Transmission message between the eNB 20 and the MTC-IWF 50. Further, the transceiving unit 21 retrieves the routing information from the MME 30. Furthermore, the transceiving unit 21 receives, on the SRB0, the MO Small Data Transmission message from the UE 10. This unit 21 can be configured by, for example, transceivers which respectively conduct communication with the UE 10, the MME 30 and the MCT-IWF 50, and a controller such as a CPU which controls these transceivers.

Figure 15:
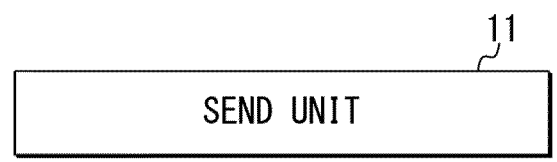
FIG. 15 is a block diagram showing a configuration example of a UE according to the exemplary embodiment.

As shown in FIG. 15, the UE 10 includes a send unit 11. The send unit 11 sends, on the SRB0, the MO Small Data Transmission message to the eNB 20. This unit 11 can be configured by, for example, a transceiver which conducts communication with the eNB 20, and a controller such as a CPU which controls this transceiver.

Based on the above description, the following document will be proposed to 3GPP.

Abstract of the Contribution:

This document presents clarification text for the editor's notes in TR 33.868, Section 5.7.4.4.3 MTC-based solution. Proposal is to remove the editor's notes replacing them with the clarification text.

1 Discussion (1) Editor's Note: The impact to MME is FFS (For Further Study) when terminating the security in the IWF and MME receives unprotected NAS message carrying small data.

In MTC-IWF based solution, when MME receives a NAS message carrying Small Data (SD), it does the following, 1) Check if the NAS message carries SD.

2) If YES, forward the SD to MTC-IWF and act on the NAS message as defined in TS 33.401.

If NO, act on the NAS message as defined in TS 33.401.

For any NAS based SD transmission solution, the above two steps show that on top of current functions, the MME will have to (1) check whether a NAS message carries SD and (2) forward the SD to the MTC-IWF. When NAS security is required, the MME has to carry the burden of integrity and confidentiality protection as well.

Two threats are possible to MME due to small data transmission (SDT):

1) Fake SD is received from
  a. A UE that is authorized to send SD
  b. A UE that is not authorized to send SD 2) Large amount of SDs are received from UEs.

These threats are valid for any NAS based solutions. Thus unprotected NAS messages carrying SD does not cause extra impact to MME. In MTC-IWF based solution the check for above threats is carried at MTC-IWF while the MME only forwards the SD to MTC-IWF.

Therefore the impact to MME is that it should verify whether the NAS message carries SD. This impact is valid for all NAS based solutions.

(2) Editor's Note: Details including confidentiality and integrity protection of the security protocols between the UE and the MTC-IWF should be given.

Figure 16:
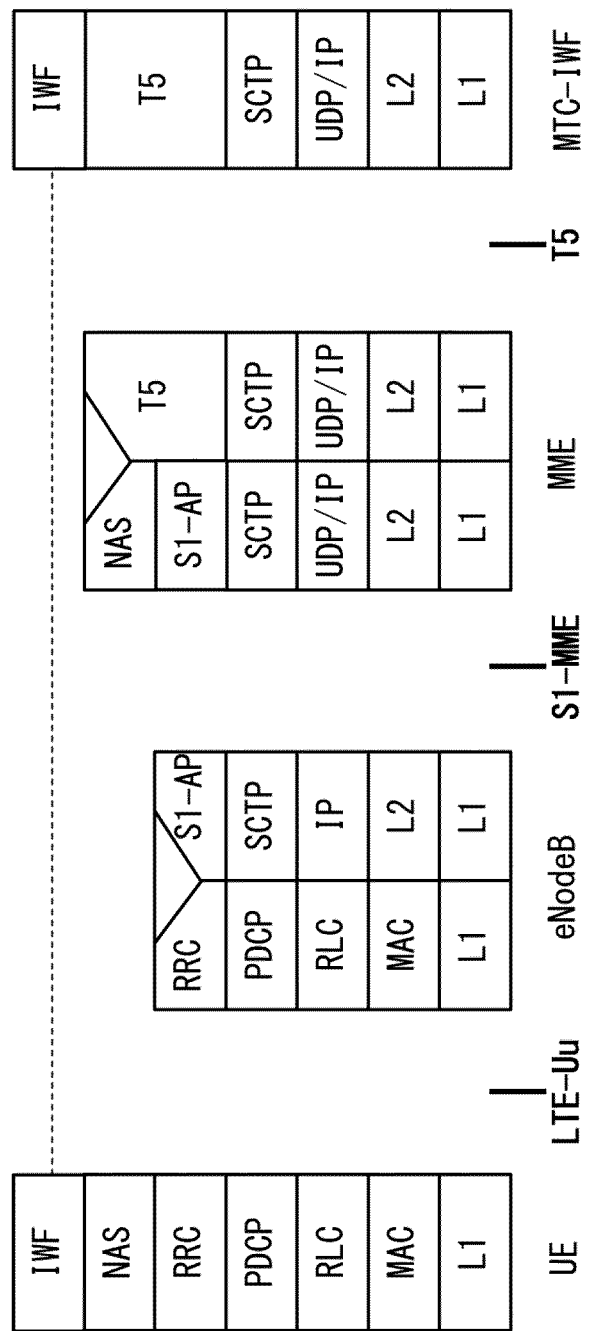
FIG. 16 is a block diagram showing a protocol stack between a UE and an MTC-IWF, which will be proposed to 3GPP based on the present invention.

FIG. 16 depicts the protocol stack for MTC-IWF based solution in more detail.

The protocol between UE and MTC-IWF can be based on PDCP (Packet Data Convergence Protocol). PDCP provides both ciphering, deciphering, integrity protection and integrity verification (as defined in [TS 36.323]) which can be re-used. MTC-IWF can be configured with the same algorithms that UE has.

Figure 17:
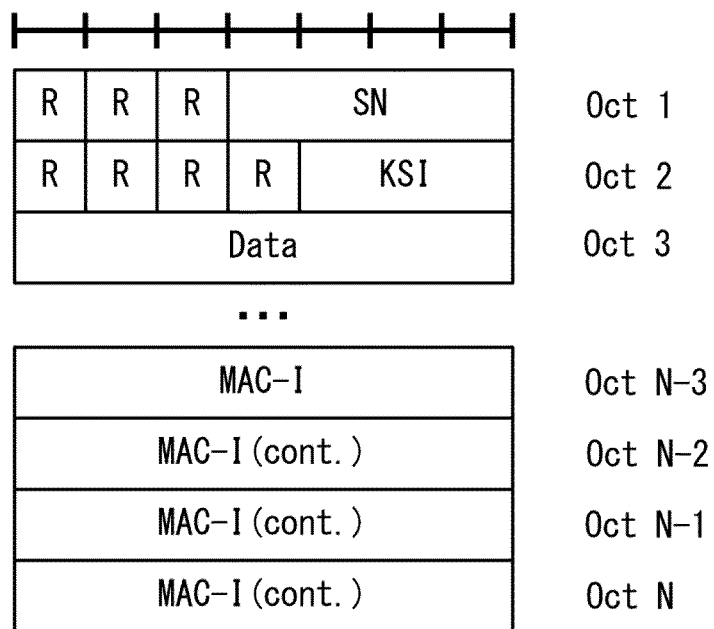
FIG. 17 is a block diagram showing a packet format which will be proposed to 3GPP based on the present invention.

FIG. 17 shows the packet format for SD that is based on the format defined in [TS 36.323].

SN (Sequence Number) can be used to prevent replay attack. KSI (Key Set Identifier) is a key identifier of subkeys for UE and MTC-IWF to determine the key to be used for small data transmission protection. MAC-I (Message Authentication Code for Integrity) is computed by the integrity subkey.

2 Proposal

We propose SA3 to approve the following change to TR 33.868.

5.7.4.4.3 Solution Overview

The solution consists of 1) Authentication and Key Agreement (AKA). During this procedure, HSS derives a master key K_iwf and sends it to MTC-IWF. 2) keys negotiation and establishment using a new Security Mode Command (SMC) procedure carried between UE and MTC-IWF—this new procedure can ride on NAS SMC. As a result of this procedure, UE and MTC-IWF share the same K_iwf and subkeys for confidentiality and integrity protection. 3) SD (both mobile originated, MO, and mobile terminated, MT) and trigger transmission: the transmission can ride on packets that do not need NAS security as per current specification, with recognition of such data is being carried, NAS security can be omitted. In the following section we propose the detailed solution.

5.7.4.4.4 Protocol Between UE and MTC-IWF

The IWF protocol is between NAS and application layer protocol for MTC, it spans between UE and MTC-IWF and can be transparent to MME/SGSN/MSC. For the protocol between MME and MTC-IWF, the T5-AP defined in clause 5.1.1.3.3 TR 23.887 [26] can be used.

FIG. 16 illustrates the protocol stack.

The protocol between UE and MTC-IWF can be based on PDCP. PDCP provides both ciphering, deciphering, integrity protection and integrity verification (as defined in [TS 36.323]) which can be re-used. MTC-IWF can be configured with the same algorithms that UE has.

FIG. 17 shows the packet format for SD that is based on the format defined in [TS 36.323].

SN can be used to prevent replay attack. KSI is a key identifier of subkeys for UE and MTC-IWF to determine the key to be used for small data transmission protection. MAC-I is computed by the integrity subkey.

5.7.6.3.2 Impacts to Existing System

The proposed solution requires support from HSS, MTC-IWF and UE It has the following impacts:

New keys derivation at UE and HSS, new keys handling in UE and MTC-IWF.

Needs an indicator of small data/trigger transmission to provide message type.

Change to NAS protocol messages for AKA and SMC.

MME needs to verify whether the NAS message carries SD.

Note: This impact is valid for all NAS based solutions.

Note that the present invention is not limited to the above-mentioned exemplary embodiment, and it is obvious that various modifications can be made by those of ordinary skill in the art based on the recitation of the claims.

The whole or part of the exemplary embodiment disclosed above can be described as, but not limited to, the following supplementary notes.

(Supplementary Note 1)

New interface is created between eNB and MTC-IWF SMC (Security Mode Command), named T6.

(Supplementary Note 2)

Device trigger and Small data transmission are delivered over T6 between eNB and MTC-IWF.

(Supplementary Note 3)

HSS requests serving eNB information from MME and sends it to MTC-IWF in Subscriber Information Response.

(Supplementary Note 4)
MME informs the eNB change by sending Serving Node Information Update to MTC-IWF at the change happens.
(Supplementary Note 5)
eNB retrieves serving MTC-IWF information from MME for MO small data transmission.
(Supplementary Note 6)
eNB pages the MTC UE locally without MME involvement before submitting the small data, especially beneficial for low mobility MTC UEs.
(Supplementary Note 7)
UE sends MO small data or MT small data confirm on SRB0, thus there is no need to have RRC Connection Establishment so as to reduce RRC signaling.
(Supplementary Note 8)
MTC-IWF sends the integrity session key, which it shares with UE, to eNB.
(Supplementary Note 9)
A node that serves as an entering point to a core network for a service provider, the node comprising:
establishment means for establishing a connection to a base station; and
transmission means for transmitting, by use of the connection, traffic between the service provider and a UE (User Equipment) that attaches to the core network through the base station,
wherein the establishment means is configured to establish as the connection:
a first connection for directly transceiving messages between the node and the base station; or
a second connection for transparently transceiving the messages through a different node that is placed within the core network and has established a different secure connection to the base station.
(Supplementary Note 10)
The node according to Supplementary note 9, wherein the establishment means is configured to acquire, from the different node, information on the base station that is necessary for establishing the first or second connection.
(Supplementary Note 11)
The node according to Supplementary note 10,
wherein the different node comprises an MME (Mobility Management Entity),
wherein the establishment means is configured to acquire the information from the MME through an HSS (Home Subscriber Server).
(Supplementary Note 12)
The node according to Supplementary note 10,
wherein the different node comprises an MME,
wherein the establishment means is configured to receive the information from the MME, each time the UE changes a base station to which the UE attaches.
(Supplementary Note 13)
The node according to any one of Supplementary notes 9 to 12, wherein the transmission means is configured to transmit, as the messages, at least one of an MTC (Machine-Type-Communication) device trigger message and a Small Data Transmission message.
(Supplementary Note 14)
A node that manages mobility of a UE attaching to a core network through a base station, the node comprising:
transfer means for transparently transferring messages between the base station and a different node, the different node serving as an entering point to the core network for a service provider and transmitting traffic between the service provider and the UE.
(Supplementary Note 15)
The node according to Supplementary note 14, further comprising:
send means for sending information on the base station to the different node.
(Supplementary Note 16)
The node according to Supplementary note 15, wherein the send means is configured to send the information through an HSS (Home Subscriber Server).
(Supplementary Note 17)
The node according to Supplementary note 15, wherein the send means is configured to send the information each time the UE changes a base station to which the UE attaches.
(Supplementary Note 18)
The node according to Supplementary note 15, wherein the send means is configured to:
page the UE at the request of the different node; and
include the information in a response to the request.
(Supplementary Note 19)
The node according to any one of Supplementary notes 14 to 18,
wherein the different node comprises an MTC-IWF (MTC Inter-Working Function),
wherein the transfer means is configured to transparently forward, as the messages, at least one of an MTC device trigger message and a Small Data Transmission message.
(Supplementary Note 20)
A node that manages subscription information on a UE attaching to a core network through a base station, the node comprising:
request means for requesting information on the base station from a first node that manages mobility of the UE; and
send means for sending the information to a second node that serves as an entering point to the core network for a service provider and that transmits traffic between the service provider and the UE.
(Supplementary Note 21)
A base station comprising:
transceiving means for transceiving messages between the base station and a node through a first connection or a second connection to the node, the node serving as an entering point to a core network for a service provider and transmitting traffic between the service provider and a UE that attaches to the core network through the base station, the first connection being for directly transceiving the messages, the second connection being for transparently transceiving the messages through a different node that is placed within the core network and has established a different secure connection to the base station.
(Supplementary Note 22)
The base station according to Supplementary note 21, wherein the transceiving means is configured to retrieve, from the different node, information that is necessary for routing a message received from the UE to the node through the first or second connection.
(Supplementary Note 23)
The base station according to Supplementary note 21 or 22, wherein the transceiving means is configured to receive, on a SRB0 (Signalling Radio Bearer 0), from the UE a message to be transmitted to the node through the first or second connection.

(Supplementary Note 24)

The base station according to any one of Supplementary notes 21 to 23, wherein the different node comprises an MTC-IWF, wherein the transceiving means is configured to transceive, as the messages, at least one of an MTC device trigger message and a Small Data Transmission message.

(Supplementary Note 25)

A UE that attaches to a core network through a base station and that communicates with a service provider, the UE comprising:

send means for sending, on a SRB0, to the base station a message to be transmitted to the service provider through the core network.

(Supplementary Note 26)

The UE according to Supplementary note 25, wherein the service provider comprises an SCS (Service Capability Server), wherein the send means is configured to send, as the message, a Small Data Transmission message.

(Supplementary Note 27)

A communication system comprising:

a base station that connects a UE to a core network; and a node that serves as an entering point to the core network for a service provider and that transmits traffic between the service provider and the UE, wherein the node establishes as a connection to the base station:

a first connection for directly transceiving messages between the node and the base station; or a second connection for transparently transceiving the messages through a different node that is placed within the core network and has established a different secure connection to the base station.

(Supplementary Note 28)

A method of controlling operation in a node that serves as an entering point to a core network for a service provider, the method comprising:

establishing a connection to a base station; and transmitting, by use of the connection, traffic between the service provider and a UE that attaches to the core network through the base station, wherein as the connection, one of following connections is established:

a first connection for directly transceiving messages between the node and the base station; or a second connection for transparently transceiving the messages through a different node that is placed within the core network and has established a different secure connection to the base station.

(Supplementary Note 29)

A method of controlling operations in a node that manages mobility of a UE attaching to a core network through a base station, the method comprising:

transparently transferring messages between the base station and a different node, the different node serving as an entering point to the core network for a service provider and transmitting traffic between the service provider and the UE.

(Supplementary Note 30)

A method of controlling operations in a node that manages subscription information on a UE attaching to a core network through a base station, the method comprising:

requesting information on the base station from a first node that manages mobility of the UE; and sending the information to a second node that serves as an entering point to the core network for a service provider and that transmits traffic between the service provider and the UE.

(Supplementary Note 31)

A method of controlling operations in a base station, the method comprising:

transceiving messages between the base station and a node through a first connection or a second connection to the node, the node serving as an entering point to a core network for a service provider and transmitting traffic between the service provider and a UE that attaches to the core network through the base station, the first connection being for directly transceiving the messages, the second connection being for transceiving the messages transparently through a different node that is placed within the core network and has established a different secure connection to the base station.

(Supplementary Note 32)

A method of controlling operations in a UE that attaches to a core network through a base station and that communicates with a service provider, the method comprising:

sending, on a radio bearer shared with one or more different UEs, to the base station a message to be transmitted to the service provider through the core network.

REFERENCE SIGNS LIST

10 UE (MTC UE)
11, 32, 42 SEND UNIT
20 eNB
21 TRANSCEIVING UNIT
30 MME/SGSN
31 TRANSFER UNIT
40 HSS
41 REQUEST UNIT
50 MTC-IWF
51 ESTABLISHMENT UNIT
52 TRANSMISSION UNIT
50H H-MTC-IWF
50V V-MTC-IWF
60 SCS

The invention claimed is:

1. A mobile communication system, comprising:
   a UE (User Equipment) that attaches to an MME (Mobility Management Entity) or an SGSN (Serving GPRS Support Node); and
   a first node that
     is connected to an SCS (Service Capability Server),
     establishes a secure connection, and
     sends data to the UE via the MME or the SGSN using the secure connection,
   wherein the first node sends a release connection message to the MME or the SGSN which deletes information on the data when the first node determines a release of the secure connection between the first node and the MME or the SGSN.

2. A first node that is connected to an SCS (Service Capability Server) in a mobile communication system, the first node comprising:
   a transceiver; and
   a controller configured to control the transceiver,
   wherein the transceiver is configured to
     establish a secure connection,
     send data via an MME (Mobility Management Entity) or an SGSN (Serving GPRS Support Node) using the secure connection to a UE (User Equipment) which attaches to the MME or the SGSN, and send a release connection message to the MME or the SGSN which deletes information on the data when the first node determines a release of the secure connection between the first node and the MME or the SGSN.

3. A UE (User Equipment) in a mobile communication system, the UE comprising:
a transceiver;
a controller configured to control the transceiver,
wherein the transceiver configured to
attach to an MME (Mobility Management Entity) or an SGSN (Serving GPRS Support Node), and
receive data via the MME or the SGSN using a secure connection from a first node which is connected to an SCS (Service Capability Server) and establishes the secure connection,
wherein the first node sends a release connection message to the MME or the SGSN which deletes information on the data when the first node determines a release of the secure connection between the first node and the MME or the SGSN.

4. A method of a mobile communication system, the method comprising:
attaching, by a UE (User Equipment), to an MME (Mobility Management Entity) or an SGSN (Serving GPRS Support Node);
establishing, by a first node that is connected to an SCS (Service Capability Server), a secure connection; and
sending, by the first node, data to the UE via the MME or the SGSN using the secure connection,
wherein the first node sends a release connection message to the MME or the SGSN which deletes information on the data when the first node determines a release of the secure connection between the first node and the MME or the SGSN.

5. A method of a first node that is connected to an SCS (Service Capability Server) in a mobile communication system, the method comprising:
establishing a secure connection;
sending data via an MME (Mobility Management Entity) or an SGSN (Serving GPRS Support Node) using the secure connection to a UE (User Equipment) which attaches to the MME or the SGSN; and
sending a release connection message to the MME or the SGSN which deletes information on the data when the first node determines a release of the secure connection between the first node and the MME or the SGSN.

6. A method of a UE (User Equipment) in a mobile communication system, the method comprising:
attaching to an MME (Mobility Management Entity) or an SGSN (Serving GPRS Support Node); and
receiving data via the MME or the SGSN using a secure connection from a first node that is connected to an SCS (Service Capability Server) and establishes the secure connection,
wherein the first node sends a release connection message to the MME or the SGSN which deletes information on the data when the first node determines a release of the secure connection between the first node and the MME or the SGSN.

7. The mobile communication system of claim 1, wherein in roaming case, the first node is located in HPLMN (Home PLMN (Public Land Mobile Network)) and a second node is located in VPLMN (Visited PLMN (Public Land Mobile Network)) for inter-connection with the first node, and the second node connects to the MME or the SGSN.

8. The mobile communication system of claim 1, wherein the first node receives the data from the SCS.

9. The mobile communication system of claim 1, wherein the secure connection is supported by integrity protection and confidential protection.

10. The first node of claim 2, wherein in roaming case, the first node is located in HPLMN (Home PLMN (Public Land Mobile Network)) and a second node is located in VPLMN (Visited PLMN (Public Land Mobile Network)) for inter-connection with the first node, and the second node connects to the MME or the SGSN.

11. The first node of claim 2, wherein the first node receives the data from the SCS.

12. The first node of claim 2, wherein the secure connection is supported by integrity protection and confidential protection.

13. The UE of claim 3, wherein in roaming case, the first node is located in HPLMN (Home PLMN (Public Land Mobile Network)) and a second node is located in VPLMN (Visited PLMN (Public Land Mobile Network)) for inter-connection with the first node, and the second node connects to the MME or the SGSN.

14. The UE of claim 3, wherein the first node receives the data from the SCS.

15. The UE of claim 3, wherein the secure connection is supported by integrity protection and confidential protection.

16. The mobile communication system of claim 1, wherein the data is small data.

17. The first node of claim 2, wherein the data is small data.

18. The UE of claim 3, wherein the data is small data.

19. The method of claim 4, wherein the data is small data.

20. The method of claim 5, wherein the data is small data.

* * * * *